(12) United States Patent
Doerr

(10) Patent No.: US 7,876,983 B2
(45) Date of Patent: Jan. 25, 2011

(54) METHOD AND APPARATUS FOR A WAVELENGTH INSENSITIVE 90-DEGREE HYBRID DEVICE

(75) Inventor: Christopher R. Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/268,705

(22) Filed: Nov. 11, 2008

(65) Prior Publication Data

US 2010/0119195 A1    May 13, 2010

(51) Int. Cl.
G02B 6/12 (2006.01)
G02B 6/24 (2006.01)

(52) U.S. Cl. .......................... 385/14; 385/15

(58) Field of Classification Search .................. 385/14, 385/15, 16, 24, 27, 31, 39, 46, 50
See application file for complete search history.

(56) References Cited

U.S. PATENT DOCUMENTS 4,904,042 A * 2/1990 Dragone ..................... 385/46
5,136,671 A 8/1992 Dragone
5,359,687 A * 10/1994 McFarland et al. ............ 385/49
6,385,373 B1 * 5/2002 Doerr et al. ................... 385/46
6,996,302 B2 * 2/2006 Hamada ....................... 385/14
7,330,618 B2 * 2/2008 Doerr .......................... 385/37
2004/0105677 A1 6/2004 Hamada

FOREIGN PATENT DOCUMENTS

KR    1020020096450 A    12/2002

OTHER PUBLICATIONS

I Kaminow/T Li, Optical Fiber Telecommunications IVI Components, Chapter 9 sections 2.4-2.6 (pp. 414-420) by Christopher R Doerr, Copyright 2002, Elsevier Science, ISBN 0-12-395172-0.
International Search Report and Written Opinion for PCT/US2009/063984; May 27, 2010, copy consisits of 11 pages.

* cited by examiner

*Primary Examiner*—Akm E Ullah
(74) *Attorney, Agent, or Firm*—Wall & Tong, LLP

(57) ABSTRACT

Provided are a method and apparatus directed to hybrid electromagnetic processing devices. The apparatus includes a planar integrated optical device. The planar integrated optical device has at least one input optical waveguide, a free space optical region and a plurality of output optical waveguides. The optical waveguides end connecting to the free space optical region. The at least one input optical waveguide has an offset in a core thereof at joined ends of an input portion and an output portion of the at least one input optical waveguide.

20 Claims, 5 Drawing Sheets

METHOD AND APPARATUS FOR A WAVELENGTH INSENSITIVE 90-DEGREE HYBRID DEVICE

FIELD OF THE INVENTION

The present invention relates to devices for processing electromagnetic signals and, more specifically, to hybrid electromagnetic processing devices.

BACKGROUND OF THE INVENTION

Optical processing and coupling devices such as hybrid optical couplers are known in the art. Such components utilize elements of carefully chosen physical dimensions to perform power division, combination and other functions. These types of devices are typically constructed to operate at specific optical frequencies.

SUMMARY

Various embodiments provide an optical device that include a free space optical region and input and output optical waveguides end connecting thereto. At least one of the optical waveguides has lateral offset between two segments thereof. The lateral offset is located near the free space optical region.

Some deficiencies of the prior art are addressed by some embodiments of the optical device for a substantially wavelength insensitive hybrid optical device. Specifically, in such embodiments, the lateral offset produces lateral mode oscillation such that a wavelength dependency of the device is reduced with respect to a device without said offset.

One embodiment features an apparatus. The apparatus includes a planar integrated optical device. The planar integrated optical device has at least one input optical waveguide, a free space optical region and a plurality of output optical waveguides. The optical waveguides end connecting to the free space optical region. The at least one input optical waveguide has an offset in a core thereof at joined ends of an input portion and an output portion of the at least one input optical waveguide.

BRIEF DESCRIPTION OF THE DRAWINGS

The teachings of the present embodiments can be readily understood by considering the following detailed description in conjunction with the accompanying drawings, in which.

DETAILED DESCRIPTION

Various embodiments will be illustrated within the context of optical coupling/processing functions being performed within a dual input, quad output (2×4) 90 degree hybrid planar optical device. Other embodiments may have a different number of optical inputs, e.g., more than 2, and a different number of optical outputs. Broadly speaking, the wavelength dependence of such an optical device, e.g., a star coupler, may be reduced by constructing the input optical waveguides with relatively abrupt offsets or displacements that cause the field to oscillate in the optical waveguide, which oscillation will be discussed herein. The period of oscillation will change with wavelength. By controlling the design parameters according to some embodiments discussed herein, the movement of the fields may be adapted to substantially reduce the wavelength dependence of the star coupler.

Figure 1:
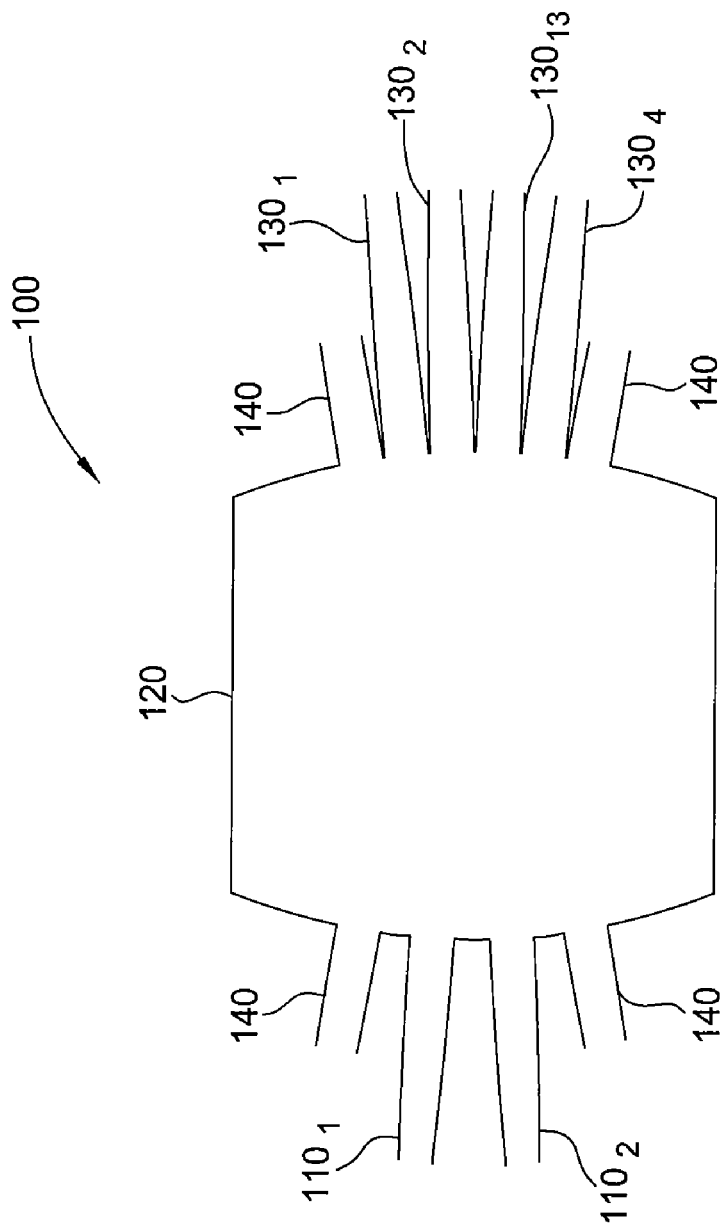
FIG. 1 depicts an example of a hybrid optical device known in the art.

FIG. 1 depicts an example of a planar optical device known in the art; namely, a star coupler 100. Star coupler 100 is a 2×4 planar optical coupler that acts as an optical 90 degree planar optical device for redistributing (e.g., splitting and/or combining) light. An optical 90 degree hybrid is a passive device. The first and second input ports receive signals A and B, respectively. The first, second, third, and fourth output ports transmit signals which are interferences between A and B with four different relative phases: 0, 90, 180, and 270 degrees, respectively. In other words, the output amplitudes from the first, second, third, and fourth output ports can be represented by (A+B)/2, (A+iB)/2, (A−B)/2, and (A−iB)/2, respectively, where i is the imaginary number. The operation of examples of conventional planar star couplers is explained, e.g., in I. Kaminow/T. Li, *Optical Fiber Telecommunications IVI Components*, Chapter 9 sections 2.4-2.6 by Chris Doerr, copyright 2002, Elsevier Science, ISBN: 0-12-395172-0, which is incorporated herein by reference in its entirety.

Star coupler 100 includes input waveguides 110$_{1-2}$, a free space region 120, and output waveguides 130$_{1-4}$. Star coupler 100 also may include optional unused dummy waveguides 140 to help make optical coupling and fabrication of star coupler 100 more uniform around the input and output waveguides 110$_{1-2}$ and 130$_{1-4}$. When star coupler 100 is acting as an optical power splitter, electromagnetic (EM) waves (i.e., optical signals) of a given intensity enter the coupler 100 through input waveguides 110$_{1-2}$, disperse through free space region 120 and are dividedly output through output waveguides 130$_{1-4}$.

A 90-degree optical hybrid in existing planar optical devices such as star coupler 100 is formed by a construction that suitably provides for differences in the optical path lengths over the different optical paths within the coupler through which EM waves propagate between inputs and outputs of the device. The optical path-length differences produce differing relative phases between light waves arriving at (and propagating through) respective output waveguides of the device. These phase differences ($\Delta\phi$) are a function of a precise design wavelength value ($\lambda_d$) based on the physical dimensions of the hybrid device. For a 2×4 star coupler such as coupler 100, $\Delta\phi$ from waveguide m1 to waveguide m2 is expressed by the following equation:

$$\Delta\phi = \frac{\pi}{2}\left(m_1 - \frac{5}{2}\right)\left(m_2 - \frac{5}{2}\right)\frac{\lambda_d}{\lambda} \quad (1)$$

wherein $\lambda$ is the wavelength of an EM wave passing through the device, $m_1$ may equal integer values 2 or 3 (because the central two waveguides of the four possible waveguides are used on the input side of the 90-degree hybrid), and $m_2$ may equal integer values 1, 2, 3 or 4. Specifically, $m_1$=2 for waveguide 110$_1$, $m_1$=3 for waveguide 110$_2$. $m_2$=1, 2, 3, and 4 for waveguides 130$_1$, 130$_2$, 130$_3$, and 130$_4$, respectively. Thus, the operational characteristics of such existing hybrid devices are wavelength dependent, which may preclude their use in some wideband optical applications.

Figure 2:
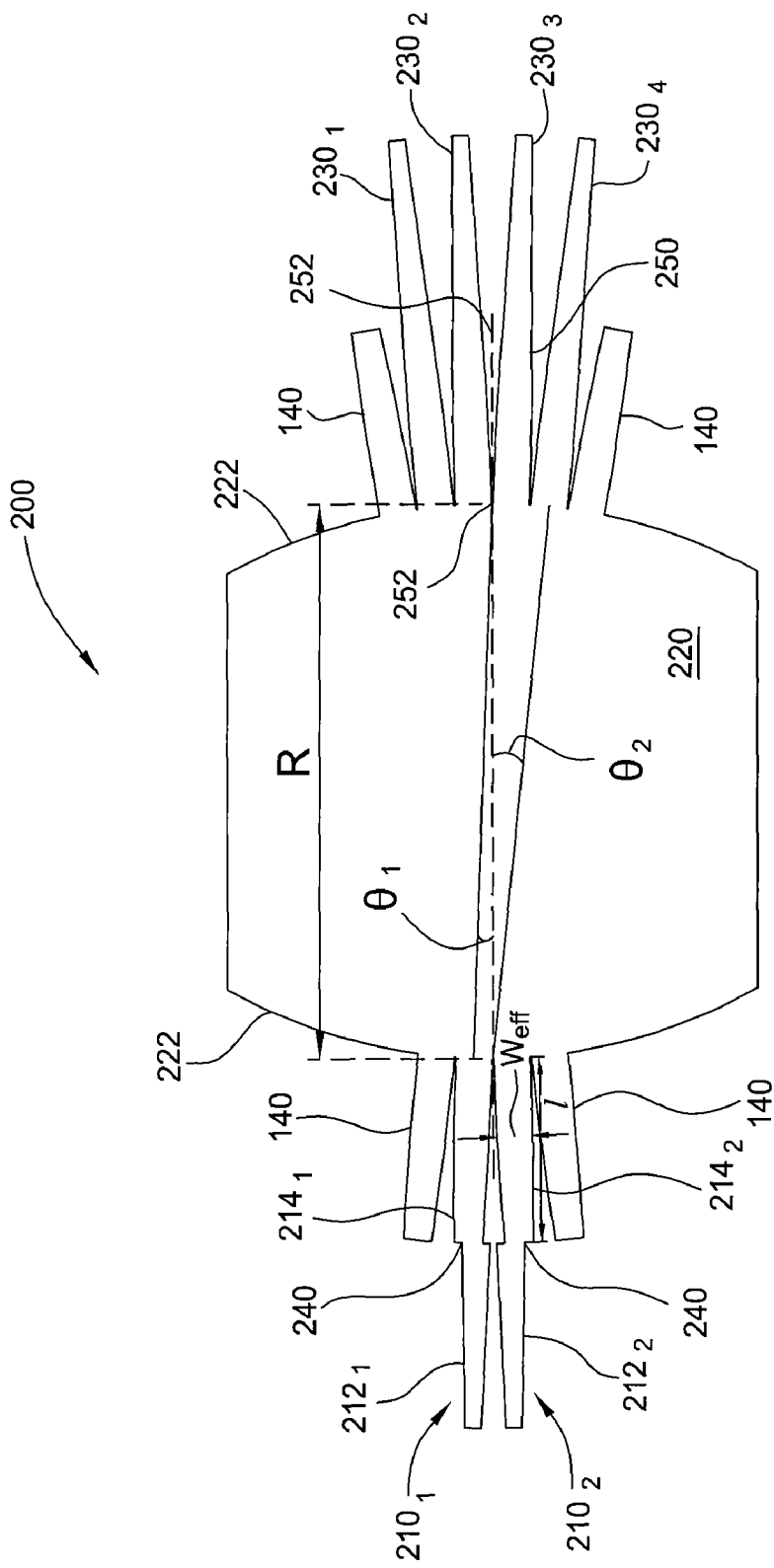
FIG. 2 depicts a 90 degree substantially wavelength insensitive 2×4 hybrid optical device performing functions according to various embodiments.

FIG. 2 depicts a 90-degree, substantially wavelength-insensitive 2×4 hybrid optical device that functions according to some embodiments. Specifically, the substantially wavelength insensitive 2×4 planar optical coupler 200 comprises a 2×4 planar optical coupler including input waveguides $210_{1-2}$, a free space region 220, output waveguides $230_{1-4}$ and optional dummy waveguides 140. However, unlike conventional star coupler 100 of FIG. 1, each input portions of the input waveguides $210_{1-2}$ of coupler 200 has input portions $212_{1-2}$ and output portions $214_{1-2}$, which are end-connected and are positioned to have a relative lateral offset 240 therebetween. In particular, the axis of the input portion $212_{1-2}$ of each input waveguide $210_{1-2}$ is laterally offset with respect to the axis of an output portion $214_{1-2}$ of the same input waveguide input $210_{1-2}$. For example, the sidewalls of the input portions $212_{1-2}$ and output portions $214_{1-2}$ of the input waveguides $210_{1-2}$ have abrupt relative offsets at the joined ends.

Each input portion $212_{1-2}$ is, e.g., relatively displaced towards the center symmetry line of coupler 200 with respect to the output portion $214_{1-2}$ of the same input waveguide $210_{1-2}$. However, it is also contemplated that in other embodiments, the offset may be oriented away from the coupler 200. The offset 240 operates to produce lateral movement of modes within input waveguides $210_{1-2}$, causing oscillation of the modes in the guide and providing some degree of wavelength insensitivity of the device according to some embodiments, which will be explained below. The oscillation is transverse with respect to the length of the waveguide, referring to propagating waves moving in a "zig-zag" pattern longitudinally along the guide and leaving the guide at different positions with respect to the center of the guide. The specific meaning of "oscillation" herein will be explained in more detail with respect to FIGS. 3A-3C. However, a more detailed discussion of the dimensions of an exemplary coupler 200 (e.g., the values I, R, $w_{eff}$, $\theta_1$ and $\theta_2$) will first be provided below.

Referring to the embodiment in FIG. 2, each offset 240 between an input portion $212_{1-2}$ and an output portion $214_{1-2}$ of the same input optical waveguide $210_{1-2}$ is constructed to be non-adiabatic. That is, each input portion $212_{1-2}$ of the input optical waveguide $210_{1-2}$ is abruptly laterally shifted with respect the output portion $214_{1-2}$ of the same optical waveguide $210_{1-2}$ at the connecting region. Each respective input portion $212_{1-2}$ and output portion $214_{1-2}$ of input waveguides $210_{1-2}$ is also wide enough to support multi-mode optical propagation therein.

The propagation constant β of a mode ν in a multi-mode waveguide is expressed by the following equation:

$$\beta_\nu \approx kn_f - \frac{\pi^2(\nu+1)^2}{2kn_f w_{eff}^2} \quad (2)$$

where k is the propagation constant in free (i.e., k=2π/λ), $n_f$ is the core refractive index and $w_{eff}$ is the effective width of the waveguide, oriented in the direction of polarization.

Various specific embodiments to be discussed and the equations that follow refer to waveguides supporting up to approximately 5 modes. However, other embodiments are also envisioned that utilize waveguides supporting a greater number of modes while still adhering to the general principles of embodiments described herein. When multi-mode wave propagation is supported in one of the input waveguides $210_{1-2}$, lateral mode oscillation is facilitated by constructing the offset 240 between the input portion $212_{1-2}$ and output portion $214_{1-2}$ of the same input waveguides $210_{1-2}$ has an approximate beat length $L_b$ expressed as:

$$L_b \approx \frac{4kn_f w_{eff}^2}{\pi} \quad (3a)$$

where k=2π/λ. As such, approximation (3a) may also be expressed as:

$$L_b \approx \frac{8n_f w_{eff}^2}{\lambda} \quad (3b)$$

In both of equations (3a) and (3b), $T_{OSC}$ depends on λ. The inventor believes that if the number of excited modes is less than or equal to approximately 5, then there is an approximate beat length which is 3 times shorter than this. For simplicity in explanation, it will be assumed that the number of modes is less than or equal to approximately 5. Thus the following equation will be used:

$$L_b \approx \frac{8n_f w_{eff}^2}{3\lambda} \quad (3c)$$

wherein $n_f$=the core refractive index of the at least one or the one or more input optical waveguides; $w_{eff}$=the effective width of the respective input waveguide; and λ=a standard telecom wavelength, such as the C-band telecom wavelength of 1,550 nm. It is noted that as a practical matter, $L_B$ is in one embodiment approximated to +/−0.1 $L_B$.

It is preferable to operate at the steepest point in the beat cycle. Thus it is desirable to have the length of the multimode waveguide to equal approximately ¼+A/2 times the beat length, where A is any integer greater than or equal to zero. Thus the output portion $214_{1-2}$ of the input waveguides $210_{1-2}$, of coupler 200 have a length l as depicted in FIG. 2 that is expressed by the following equation:

$$l = \frac{2(1+2A)n_f w_{eff}^2}{3\lambda_d} \quad (4)$$

The input and output boundaries of the free space region of the coupler 200 have a radius of curvature R. The dimensions of coupler 200 include angles $\theta_1$ and $\theta_2$. $\theta_1$ is the angle between the position (e.g., center of energy) of the center of the wavefront of a light wave at the input boundary 222 as the light wavefront exits input waveguide $210_1$ according to various embodiments, and the intersection 252 of output waveguides $230_2$ and $230_3$ at the output boundary 222 of free space region 220 at the opposite side of the coupler 200, with respect to a vertical centerline 250. $\theta_2$ is the angle between the intersection 254 of input waveguides $210_1$ and $210_2$ at the input boundary 222 of free space region 220 and the center of output waveguide $230_4$ with respect the centerline 250 at the output boundary 222. By choosing the appropriate values of l and $w_{eff}$ (e.g., according to equation 4), mode oscillation is facilitated.

An illustration of optical mode oscillation will now be discussed. As has already been described with respect to equation (3b), $L_b$ depends on wavelength λ. In one embodiment, $\lambda_d$ is a standard telecom wavelength, such as the C-band telecom wavelength of 1,550 nm. In the referenced embodiment involving planar optical coupler 200, the phase difference from a port at $\theta_1$ to another port at $\theta_2$—i.e., $\phi_{12}$—is expressed by the following equation:

$$\phi_{12} = kR\theta_1\theta_2 = \frac{2\pi}{\lambda}R\theta_1\theta_2 \qquad (5)$$

From Eq. (5), one can see that $\phi_{12}$ depends on $\lambda$, which gives rise to the unwanted wavelength dependence of the coupler. Since waveguide $210_1$ is wide enough to support multi-mode propagation, it will be shown that the relative lateral position of the center of the propagating optical mode in the optical waveguide changes the value of $\theta_1$ when $\lambda$ changes. This movement of $\theta_1$ can be designed to partially or mostly cancel the net dependence of $\phi_{12}$ on $\lambda$, thus substantially reducing or eliminating wavelength dependency of the coupler.

In various embodiments of coupler 200, the size of the lateral offsets 240 between the input portions $212_{1-2}$ and the output portions $214_{1-2}$ of the same input waveguides $210_{1-2}$ may vary. Generally speaking, the larger the lateral offset 240, the larger the transmission loss that will occur to an incident wave thereto. Too large an offset will produce too large a loss, while too small an offset will lead to a lack of sufficient lateral oscillation of the optical mode in the waveguide to significantly reduce the wavelength dependency of the optical coupler 200. Typical offsets 240 that have been utilized by the inventor include $w_{eff}/4$. That is offset input portions of the input portions $212_1$ and $212_2$ of the input waveguides are set inward (toward the centerline of coupler 200) by a length of $w_{eff}/4$ with respect to the output portions $214_1$ and $214_2$ of the input waveguides. But, embodiments are also envisioned where one are more offsets are set outward with respect to the centerline of coupler 200. In various embodiments, for instance, If the value 'A' in equation (4) is an even integer, the offsets 240 of input portions $212_{1-2}$ are positioned inward toward the centerline 250 of coupler 200. Conversely If 'A' is an even integer, the offsets 240 of input portions $212_{1-2}$ are positioned outward away the centerline 250 of coupler 200. The position of the center of the propagating optical modelateral to the direction of propagation in the multi-mode waveguide at the star coupler free-space region boundary will change with $\lambda$. This movement of the lateral center of a propagating mode can compensate for the wavelength-dependence in the relative phase difference between light received at the ends of adjacent output waveguides, i.e., at the second or output boundary 222 of the star coupler 220.

In one embodiment, the offset has a size of about $w_{eff}/4 \pm (0.1)w_{eff}/4$, wherein $w_{eff}/4$ is a width of a core of the at least one of the one or more input optical waveguides.

Generally speaking, offsets of $w_{eff}/2$ or less, when utilized in embodiments such as coupler 200, can keep the offsets substantially non-adiabatic and produce the desired oscillatory effects. It should be emphasized however, that any specific mention of a particular offset 240 value (e.g., $w_{eff}/2$ and/or $w_{eff}/4$) herein is provided purely as an example, and should not be construed as limiting the scope of any referenced or other embodiments to any particular dimensional constraint(s). Rather, any suitable offset value or other means of producing oscillation may be utilized while still adhering to the overall principles.

It is important to note that teachings herein are broadly applicable to facilitating substantial wavelength independence of relative phases in adjacent output waveguides in planar optical devices. The embodiments adapt or cause various modes of optical or electrical oscillations in input and/or output waveguides of the device. Thus, an oscillation caused by an offset 240 in waveguides $210_{1-2}$ is merely an example pertaining to one particular embodiment.

Figure 3:
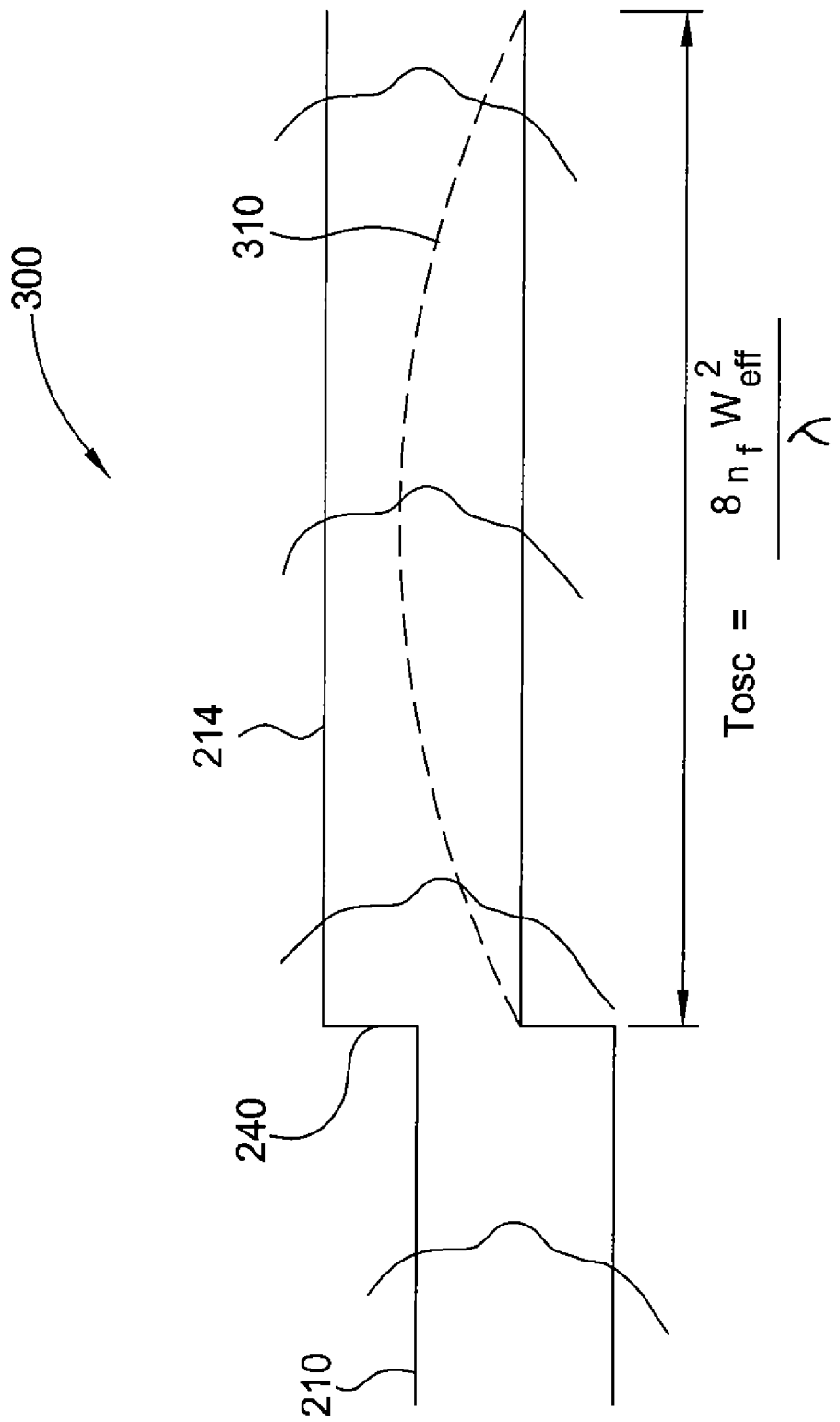
FIG. 3 graphically depicts a mode oscillation profile according to various embodiments; and To facilitate understanding, identical reference numerals have been used, where possible, to designate identical elements or elements with similar function in the figures.
Figure 3A:
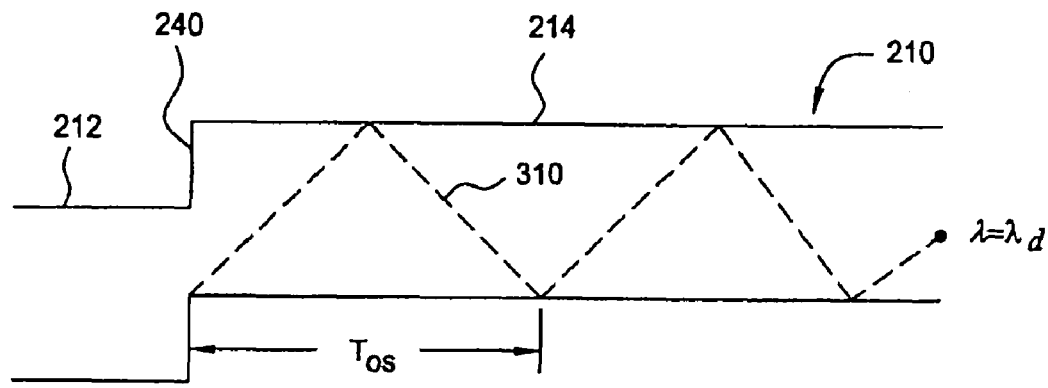
Figure 3B:
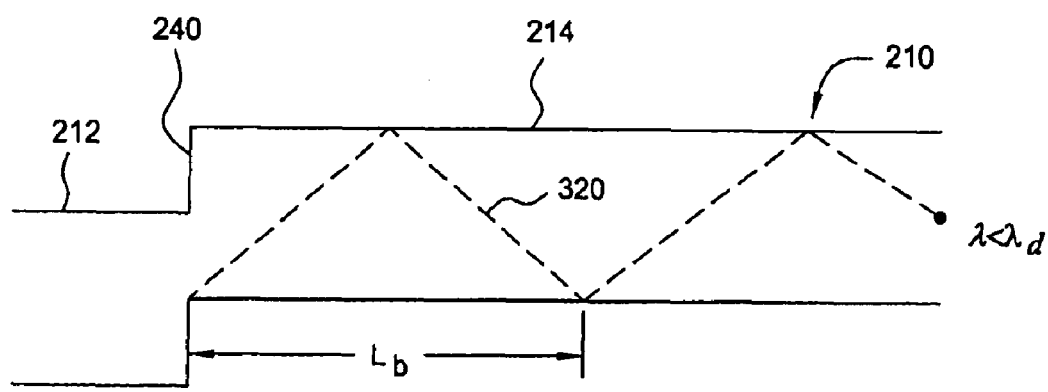
Figure 3C:
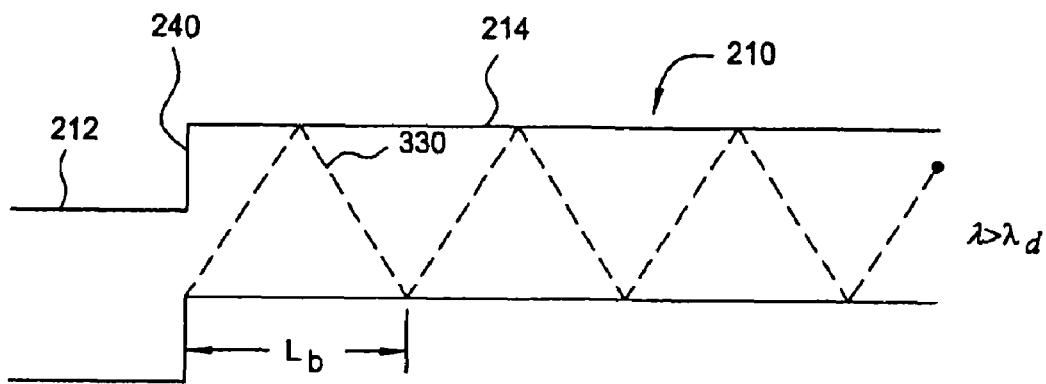

FIGS. 3A-3C depict exemplary oscillation profiles 310, 320 and 330 of optical propagating modes, useful in understanding various embodiments such as the one described with respect to the embodiment of FIG. 2. Mode oscillation profiles 310, 320 and 330 of the optical propagating mode are shown for illustrative purposes as occurring in waveguide 210 (of coupler 200), with offset 240 and offset and non-offset waveguide portions 212 and 214 respectively. Mode oscillation profiles 310, 320 and 330 are not drawn to any particular scale or with respect to any specific wavelengths, but are intended to be viewed in comparison to each other to illustrate the concept of how beat length changes with $\lambda$ relative to $\lambda_d$ in waveguide structures such as waveguides $210_{1-2}$.

Mode oscillation profile 310 depicts the path of the center energy of one or more modes laterally oscillating (due to offset 240) in a "zig-zag" pattern while propagating longitudinally along a non-offset waveguide portion 214 of a waveguide 210, to produce reduced wavelength sensitivity of the device (e.g., coupler 200) to which the waveguide is connected, according to various embodiments. The period of oscillation ($T_{OSC}$) corresponds to beat length as defined by equations (3a) and (3b). Beat length $L_b$ of mode oscillation profile 310 is indicative of $\lambda=\lambda_d$. By contrast, mode oscillation profile 320 depicts an example of beat length (relative to mode oscillation profile 310) when $\lambda<\lambda_d$. In following with equations (3a) and 3(b), the beat length $L_b$ of mode oscillation profile 320 is thus increased compared to the $\lambda=\lambda_d$ beat length example of mode oscillation pattern 310. Finally, oscillating mode profile 330 illustrates an exemplary beat length according to $\lambda>\lambda_d$, which is decreased relative to oscillation profile 310.

The mode oscillation profiles discussed with respect to FIGS. 3A-3D may be adapted to influence response characteristics of devices according to various embodiments, such that wavelengths to which such devices are less sensitive to pass through the devices with little or no encumbrance, while wavelengths to which the device is more sensitive to are reduced or attenuated. Various embodiments impart mode oscillations using different structures and techniques, such as described herein in more detail. Generally speaking, the mode oscillations are implemented in a manner adapted to the specific wavelength sensitivities of the device. The various equations discussed herein may be used to calculate the appropriate mode oscillation profile. Alternatively, the mode oscillation profile may be determined empirically.

Figure 3D:
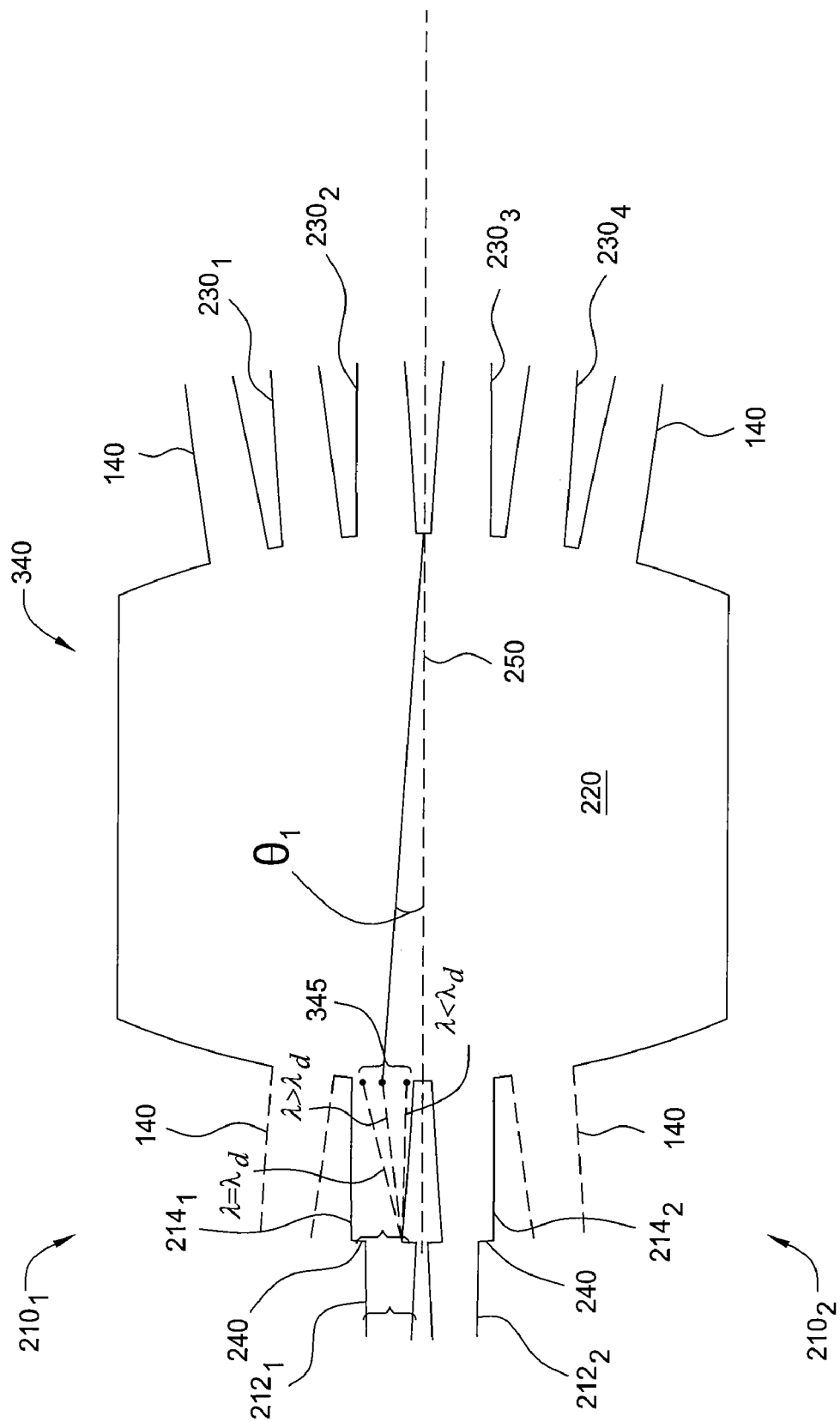

FIG. 3D depicts a coupler 340, similar to coupler 200, illustrating further details of how mode oscillation may be facilitated in the connection terminals of devices utilizing offsets such as offset 240 of FIG. 2, to produce mode oscillation in the terminals (e.g., waveguides) and decrease wavelength sensitivity according to various embodiments. Like coupler 200, coupler 340 is a 90 degree, substantially wavelength insensitive 2×4 hybrid optical device, including input waveguides $210_{1-2}$, a free space region 220, output waveguides $230_{1-4}$, dummy waveguides 140, offsets 240 and respective offset portions $212_{1-2}$ and non-offset portions $214_{1-2}$. As mentioned with respect to the exemplary embodiment depicted in FIG. 2 and equation (5), a change in excitation wavelength $\lambda$ in the coupler 200 (and coupler 340) creates a shift of $\theta_1$, providing wavelength insensitivity of the coupler(s) according to various embodiments.

The dynamic shifting capability of $\theta_1$, which was previously discussed with respect to FIGS. 3A-3C is displayed as $\theta_1$ shift range 345 in FIG. 3B. If excitation wavelength $\lambda$ is equal to the design wavelength $\lambda_d$ ($\lambda=\lambda_d$), the lateral orientation of optical energy as it exits waveguide 210 is in the center of the guide, and $\theta_1$ remains same value as it would be if there were no offset 240. When the coupler (200 or 340) excitation wavelength $\lambda$ is greater than the design wavelength $\lambda_d$, as is shown in mode oscillation profile 330 of FIG. 3C, beat length $L_b$ is reduced (e.g., according to equation (3b)), causing the lateral orientation of optical energy exiting the waveguide 210 to be situated farther away from the horizontal centerline 250 of the coupler compared to its position if $\lambda=\lambda_d$ making $\theta_1$ larger. Conversely, when excitation wavelength $\lambda$, is less than the design wavelength $\lambda_d$, such as in oscillation profile 320 of FIG. 3C, beat length is increased, causing the lateral orientation of optical energy in the waveguide 210 to be situated closer to the horizontal centerline 250 of the coupler (compared to the $\lambda=\lambda_d$ case), making $\theta_1$ smaller.

Various embodiments impart mode oscillations using different structures and techniques, such as described herein in more detail. Generally speaking, the mode oscillations are implemented in a manner adapted to the specific wavelength sensitivities of the device. The various equations discussed herein may be used to calculate the appropriate mode oscillation profile. Alternatively, the appropriate mode oscillation profile may be determined empirically.

FIGS. 2 and 3A-3D depict offsets 240 on the outer side of input waveguides $210_{1-2}$. That is, non-offset output portion 214 as an end positioned at the input boundary 222, between free space region 220 and offset portion 212. In various embodiments, if the length l in FIG. 2 is less than half the beat length $L_b$ (e.g., per equations 3a and/or 2b) will provide a lateral movement of the guided mode that will partially compensate wavelength dependence of the relative phase at the ends of adjacent output waveguides $230_1$ and $230_2$. In other embodiments, if l is larger than $T_{OSC}$ then the relative lateral offset positions of input portions 212 of the input waveguide and the output portions 214 of the input waveguides should be reversed. Various embodiments are also envisioned wherein planar optical devices are constructed with input portions 212 and output portions 214 of the input optical waveguide are in both the preceding orientations.

Various embodiments are also envisioned where the oscillation produced in the guided optical mode is adjustable. That is, oscillation profiles such as respective oscillation profiles 310, 320 and 330 of FIGS. 3A-3C are not based solely on the device's physical dimensions and material composition. For instance, it is contemplated that in one embodiment, a planar optical device such as coupler 200 is constructed on an Indium Phosphide (InP) semiconductor substrate with electrodes positioned along the length of a multi-mode waveguide (lead), such as $214_{1-2}$. By suitably biasing the electrodes, a current is created in the guide changes the refractive index along its length. By adjusting refractive index (e.g., beat length), the properties of the oscillation may be moved, and/or the coupler may be tuned.

It should be emphasized, however, that various embodiments as a whole should not be construed as being limited by any characteristic dimensions and/or construction details particular to any exemplary embodiment discussed herein. Likewise, although particular embodiments discussed herein are optical devices, the overall basic principles of the various embodiments as a whole are not at all limited to optical devices. It is fully envisioned that the basic principles of the various embodiments as a whole can be equally applied to electrical devices, including distributed element varieties, or any other type of device wherein wavelength dependency is controlled by causing an oscillating mode in at least one lead thereof.

While the foregoing is directed to various embodiments, other and further embodiments may be devised without departing from the basic scope thereof. As such, the appropriate scope is to be determined according to the claims, which follow.

What is claimed is:

1. An optical device, comprising:
a free space optical region;
one or more input optical waveguides end connected to the free space optical region along a first surface thereof; and
one or more output optical waveguides end connected to the free space optical region along a second surface thereof, the second surface facing the first surface;
wherein at least one of the one or more input optical waveguides supports multi-mode propagation and includes an offset at joined ends of an input portion and an output portion thereof, the output portion end connecting to the first surface; and
wherein the set of input and output optical waveguides includes at least three optical waveguides.

2. The optical device of claim 1, wherein the offset is adapted to cause an oscillating mode in the at least one of the one or more input optical waveguides.

3. The optical device of claim 1, wherein the wherein the one or more output optical waveguides includes at least two output optical waveguides.

4. The optical device of claim 3, wherein the another of the one or more input optical waveguides supports multi-mode propagation and includes an offset at joined ends of an input portion and an output portion thereof, the output portion of the another of the one or more input optical waveguides terminating along the first surface.

5. The optical device of claim 2, wherein the oscillating mode has a beat length $L_b$ of approximately:

$$L_b \approx \frac{8n_f w_{\it eff}^2}{3\lambda}$$

wherein:
$n_f$=the core refractive index of the at least one or the one or more input optical waveguides;
$w_{\it eff}$=the effective width of the respective input waveguide; and
$\lambda$=a standard telecom wavelength.

6. The optical device of claim 1, wherein the output portion of the at least one of the one or more input waveguides has a length l expressed as:

$$l = \frac{2(1+2A)n_f w_{\it eff}^2}{3\lambda_d}$$

wherein:
$n_f$=the core refractive index of the waveguide;
$w_{\it eff}$=an effective width of the at least one of the one or more input optical waveguides;
$\lambda_d$=a standard telecom wavelength; and
A=an integer $\geq 0$.

7. The optical device of claim 1, wherein the offset has a size of about $w_{eff}/4 \pm (0.1) w_{eff}/4$, wherein $w_{eff}/4$ is a width of a core of the at least one of the one or more input optical waveguides.

8. The optical device of claim 1, wherein the optical device is a planar device on a planar semiconductor substrate.

9. The optical device of claim 1, wherein the refractive index of a portion of an optical core of the at least one of the one or more input optical waveguides is adjustable electrically or thermally.

10. The optical device of claim 8, wherein the substrate comprises Indium Phosphide.

11. The optical device of claim 9, wherein the refractive index is adjustable by an electrical bias applied to the semiconductor substrate.

12. The optical device of claim 11, wherein the optical device is a star coupler.

13. The optical device of claim 1, wherein the at least one respective input waveguide supports up to 5 modes.

14. An apparatus comprising:
   a planar integrated optical device having at least one input optical waveguide, a free space optical region and a plurality of output optical waveguides, the optical waveguides end connecting to the free space optical region, wherein:
      the at least one input optical waveguide includes an offset in a core thereof at joined ends of an input portion and an output portion of the at least one input optical waveguide.

15. The apparatus of claim 14, wherein the optical device is constructed on a planar semiconductor substrate and the refractive index of a portion of the at least one input optical waveguide is adjustable via an electrical bias applied thereto.

16. The apparatus of claim 14, wherein the output portion of the at least one respective input waveguide has a length l expressed as:

$$l = \frac{(1+2A)n_f w_{eff}^2}{3\lambda_d}$$

wherein:
   $n_f$=the core refractive index of the waveguide;
   $w_{eff}$=an effective width of the at least one of the one or more input optical waveguides;
   $\lambda_d$=a standard telecom wavelength; and
   A=an integer $\geq 0$.

17. The apparatus of claim 14, wherein the substrate comprises Indium Phosphide.

18. A method of operating a planar integrated optical device having an input optical waveguide, a free space optical region and a plurality of output optical waveguides, comprising:
   sending light into a first end of the input optical waveguide such that a center of a guiding mode of the light laterally oscillates in the input optical waveguide near and before a second end thereof, the second end connecting to a surface of the free space optical region, the output optical waveguides end connecting to the free space optical region.

19. The method of claim 18, further comprising:
   adjusting a refractive index of a portion of the input optical waveguide near the second end to cause the center of the guiding mode to laterally oscillate in the input optical waveguide near the second end.

20. The method of claim 18 wherein the oscillation of the guiding mode has a beat length $L_b$ of approximately:

$$L_b \approx \frac{8 n_f w_{eff}^2}{3\lambda}$$

wherein:
   $n_f$=the core refractive index of the at least one or the one or more input optical waveguides;
   $w_{eff}$=the effective width of the respective input waveguide; and
   $\lambda$=a standard telecom wavelength.

* * * * *